Oct. 10, 1950
H. W. LORD
ELECTRICAL HIGH-FREQUENCY
PULSE TRANSLATING NETWORK
Filed June 24, 1948
2,525,454
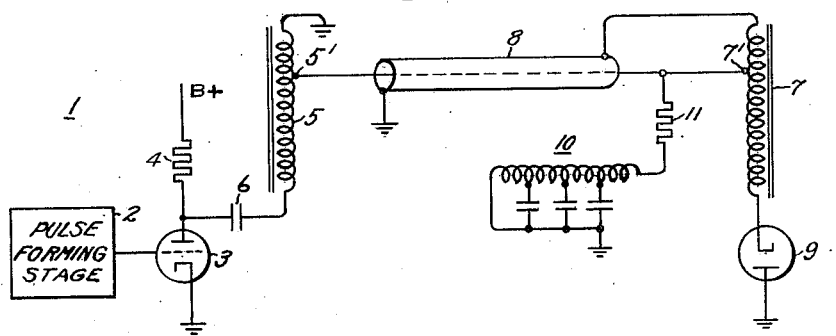
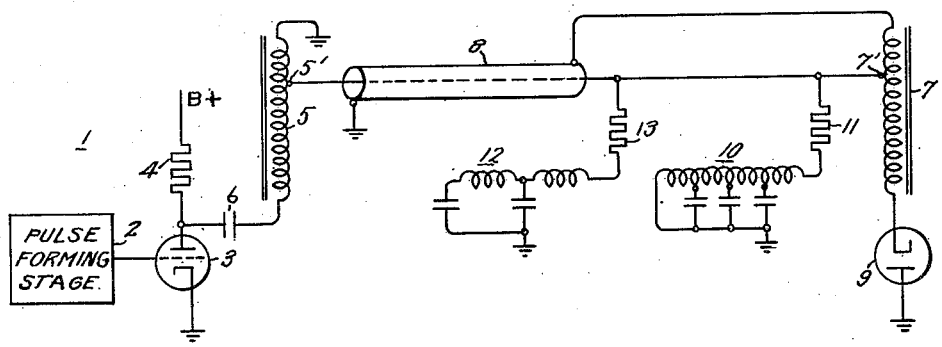
Inventor:
Harold W. Lord,
by *Merton D Moore*
His Attorney.

Patented Oct. 10, 1950

2,525,454

UNITED STATES PATENT OFFICE 2,525,454

ELECTRICAL HIGH-FREQUENCY PULSE TRANSLATING NETWORK

Harold W. Lord, Schenectady, N. Y., assignor to General Electric Company, a corporation of New York Application June 24, 1948, Serial No. 34,853

5 Claims. (Cl. 178—44)

This invention relates to high frequency electrical networks, and more particularly to such networks useful for the transmission of electrical pulses and the like.

It is an object of this invention to provide such an electrical network for transmitting desired electrical signals, and having characteristics such that the desired signals are passed thereby and undesired spurious signals or oscillations are effectively suppressed therein.

The development of pulse transformers has made it possible to transmit electrical pulses over cables of considerable length since the transformer can be used to match the impedance of both the input circuit which may be for example, a modulator, and the output, or load circuit, to the cable impedance. In many instances, however, the load and input circuit impedances vary greatly over different portions of the individual pulses. For example, when a magnetron forms the load impedance in such a system, the impedance of this type of load is extremely high at threshold potentials only slightly below the operating range. With such a load the transmission cable is not properly terminated nor is the input modulator properly loaded during the rise and fall of the individual pulses. This mismatching at low pulse potentials often results in the presence of spurious oscillations in portions of the potential wave immediately preceding and following each main pulse. These oscillations may produce signals in the utilization circuit which mask the desired signals. Such undesired oscillations are particularly prevalent at the trailing edge of a pulse, although they may occur to a lesser degree at the leading edge.

One of the features of my invention is the use of a time delay circuit short-circuited at one end and connected through a series resistor, having an impedance bearing a desired relation to the impedance of the cable, to the load end of the transmission cable to suppress the spurious oscillations resulting from the trailing edge of a pulse translated by the cable. Another feature is the use, in conjunction with such a circuit, of a second time delay circuit open-circuited at one end to suppress spurious oscillations resulting from the leading edge of such a pulse.

The features of this invention which are believed to be new are set forth with particularity in the appended claims. The invention itself, however, together with further objects and advantages thereof may best be understood by reference to the following description when taken in conjunction with the accompanying drawing in which Fig. 1 is a circuit diagram of a pulse translating network suitably embodying my invention and Fig. 2 is a modification of the pulse translating network of Fig. 1.

Referring now to Fig. 1, the proposed network is shown incorporated in a magnetron pulsing circuit, and is utilized to suppress spurious oscillations established in the transmission cable between the pulsing modulator stage and the magnetron stage, these oscillations being due to a mismatch between the impedances of the modulator cable and magnetron stage which occurs during different portions of the individual desired pulses.

A conventional modulator stage 1 supplies pulses of energy to a magnetron stage in a manner to be described. The modulator stage 1 includes a pulse forming stage 2 and a power amplifier stage, comprising an electron discharge device 3 whose anode is connected to a source of unidirectional potential B+ through a resistor 4, the cathode of device 3 being connected to ground, and the control electrode thereof being coupled to the output of pulse forming stage 2. The amplified output of stage 2 is applied to one extremity of pulse transformer 5 through a capacitor 6, the other extremity of transformer 5 being connected to ground. A tap 5' on transformer 5 is connected to a corresponding tap 7' of a further pulse transformer 7 through transmission cable 8. One extremity of transformer 7 is connected to the sheath of transmission cable 8, and hence, to ground, the other extremity of the transformer being connected to the cathode of magnetron 9. The anode of magnetron 9 is connected to ground.

The circuit thus far described constitutes a conventional magnetron pulsing arrangement, the magnetron oscillating for intervals determined by the pulses formed in stage 2, amplified by power amplifier 3, and transmitted from one stage to the other by cable 8. As previously discussed, pulse transformers 5 and 7 are utilized to match the impedances of the modulator and magnetron to the impedance of the transmission cable 8. Since magnetron 9 has a non-linear impedance characteristic transmission cable 8 is not properly terminated nor is the modulator 1 properly loaded during the rise and fall of the individual transmitted pulses. To suppress the generation of spurious oscillations due to the fall of such a pulse, that is, to the trailing edge of the pulse, I provide a time delay network or circuit 10, short-circuited at one end, and connected, on one hand, to the load end of cable 8 through a resistor 11 and, on the other hand, to ground, as shown. The delay time of circuit 10 is made slightly less than the duration of each of the desired pulses, and the characteristic impedance thereof is of the order of ten times that of cable 8. Hence, the power consumed by circuit 10 is negligible compared to the power delivered to the magnetron 9, that is, the electrical signals are transmitted to the magnetron substantially without attenuation. However, at the end of the delay time, the impedance of circuit 10 becomes extremely low and resistor 11 in effect connects the load end of cable 8 to ground through resistor 11. The resistor 11, which has an impedance equal to the characteristic impedance of cable 8, loads the cable heavily and absorbs the major portion of any oscillations immediately following each of the desired pulses. It can be seen, therefore, that the time delay circuit 10 may be so constructed that only desired pulses are passed by cable 8 and other undesired oscillations are suppressed by the network.

In Fig. 2, I have shown a modification of the circuit of Fig. 1 in which means are provided likewise to suppress the oscillations which tend to be established by the leading edge of a pulse translated by the cable 8. This means comprises a second time delay network or circuit 12 comprising a plurality of serially connected inductances and shunt connected capacitors connected across the output terminals of cable 8 through a resistor 13. The delay line 12 is an open-circuited line and has a time delay characteristic such that the time required for a pulse to travel down the line and return to its input terminals is equal to the rising time of a pulse translated by cable 8, that is, the leading edge of such a pulse. Such a time ordinarily is of the order of ten per cent or less of the total pulse time. Accordingly, the energy stored in the network during this period is a relatively small portion of the total energy of the pulse translated by cable 8. In this circuit, both resistor 13 and delay network 12 have impedances which are equal to one-half of the characteristic impedance of cable 8. In all other respects, the circuit of Fig. 2 is the same as that of Fig. 1 and operation of the two circuits so far as suppression of oscillations due to the trailing edge of the pulse is the same.

This invention, therefore, provides a network arrangement that is particularly useful in a system wherein it is desired to translate certain desired signals only, and to suppress any spurious oscillations that may arise from the translation of such desired signals.

While a certain preferred embodiment has been shown and described, it will of course be understood that various modifications may be made without departing from the invention. The appended claims are therefore intended to cover any such modifications within the true spirit and scope of the invention.

What I claim as new and desire to secure by Letters Patent of the United States is:

1. In a pulse translating system, the combination comprising a cable, means for supplying a pulse to be translated to one end of said cable, pulse utilization means connected across the other end of said cable, said utilization means having a low impedance when the intensity of said pulse exceeds a predetermined level and a high impedance when said intensity is below said level, and means for suppressing the establishing of undesired oscillations in said cable due to the change in the impedance characteristic of said utilization means comprising a time delay circuit and a resistance connected in series across said other end of said cable, the time delay of said circuit being such that the impedance of said resistance and said time delay circuit in series is high during periods when the intensity of said pulse is greater than said predetermined intensity and low during periods when the intensity of said pulse is below said predetermined intensity.

2. A pulse translating network comprising a cable, means for supplying a pulse to be translated to one end of said cable, pulse utilization means connected across said cable at its other end and tending to establish undesired oscillations across said cable, and means to suppress such undesired oscillations comprising a pair of time delay circuits connected across said other end of said cable through respective resistances, one of said circuits being open-circuited at its end remote from its associated resistance and having a delay time of the order of the duration of the leading edge of a pulse to be translated, and the other of said circuits being short-circuited at its end remote from its associated resistance and having a delay time of the order of the duration of a pulse to be translated.

3. In a pulse translating system, the combination comprising a cable, means for supplying a pulse to be translated to one end of said cable, pulse utilization means connected across the other end of said cable, said utilization means having a non-linear operating characteristic tending to establish undesired oscillations during the trailing edge of said pulse, and means for suppressing said undesired oscillations comprising a time delay circuit connected across said other end of said cable through a resistance, said time delay circuit being short-circuited at its end remote from said resistance and having a delay time of the order of the duration of a pulse to be translated.

4. In a pulse translating system, the combination comprising a cable, means for supplying a pulse to be translated to one end of said cable, pulse utilization means connected across the other end of said cable, said utilization means having a non-linear operating characteristic tending to establish undesired oscillations during the leading edge of said pulse, and means for suppressing said undesired oscillations comprising a time delay circuit connected across said other end of said cable through a resistance, said time delay circuit being open-circuited at its end remote from said resistance and having a delay time of the order of the duration of the leading edge of a pulse to be translated.

5. In a pulse translating system, the combination comprising a cable, means for supplying a pulse to be translated to one end of said cable, pulse utilization means connected across the other end of said cable, said utilization means having a non-linear operating characteristic tending to establish undesired oscillations during the leading edge of said pulse, and means for suppressing said undesired oscillations comprising a time delay circuit connected across said other end of said cable through a resistance, said time delay circuit being open-circuited at its end remote from said resistance and said resistance and said circuit each having a value of impedance equal to one-half the characteristic impedance of said cable, said time delay circuit having a delay time of the order of the duration of the leading edge of a pulse to be translated.

HAROLD W. LORD.

REFERENCES CITED

The following references are of record in the file of this patent:

UNITED STATES PATENTS

| Number | Name | Date |
| --- | --- | --- |
| 2,266,154 | Blumlein | Dec. 16, 1941 |
| 2,401,416 | Eaton et al. | June 4, 1946 |
| 2,436,662 | Norgaard | Feb. 24, 1948 |